July 14, 1953

A. E. ROWE 2,644,971

LOADING DOCK CONSTRUCTION

Filed Nov. 18, 1949

INVENTOR.
Arthur E. Rowe
BY Robb & Robb
Attorneys

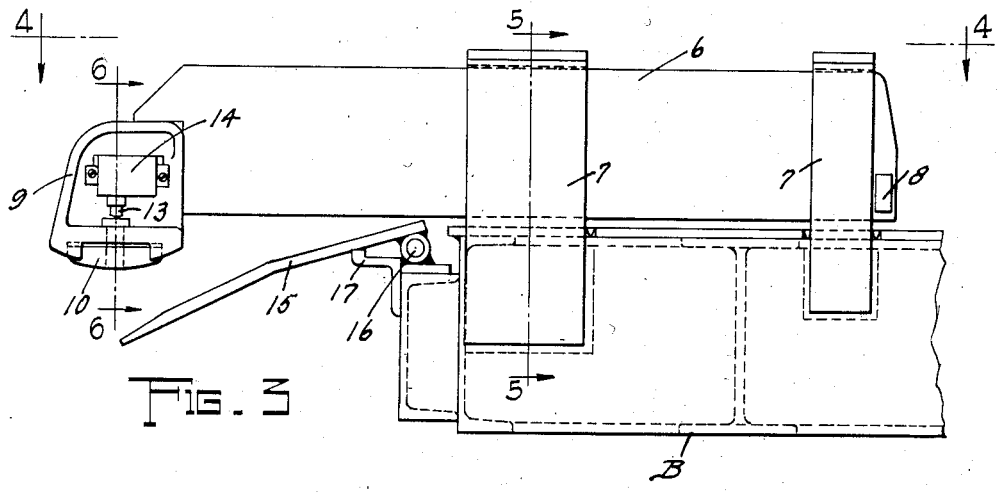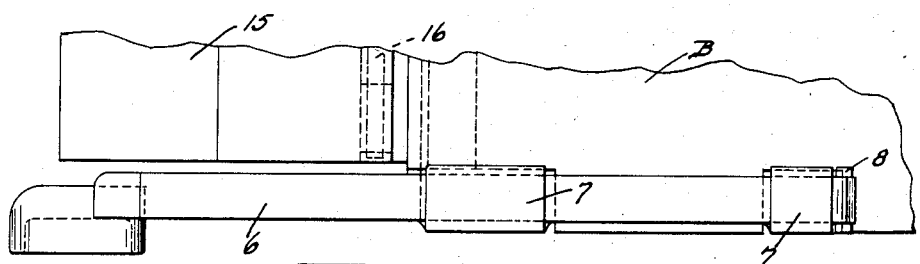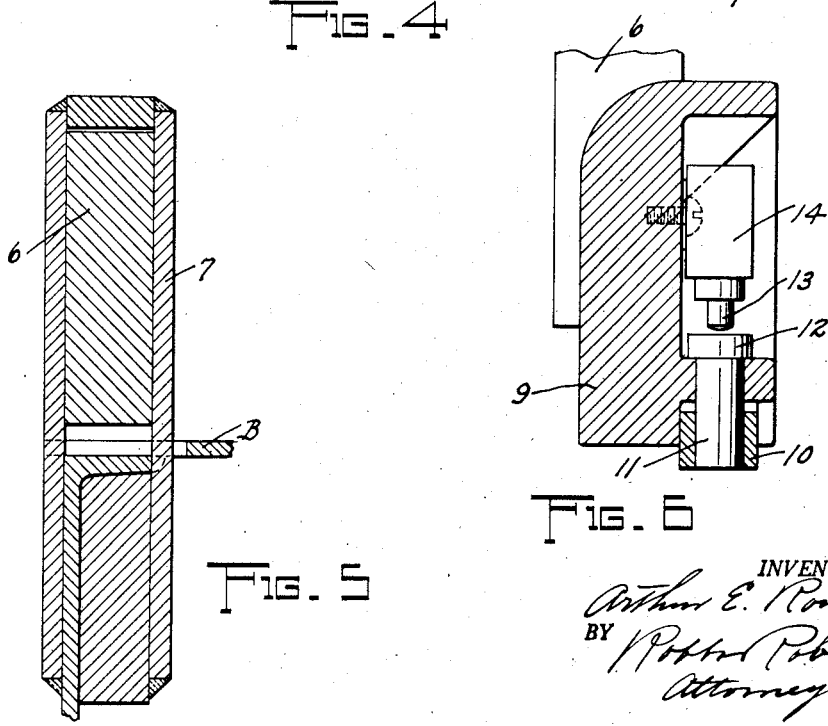

July 14, 1953  A. E. ROWE  2,644,971
LOADING DOCK CONSTRUCTION
Filed Nov. 18, 1949  3 Sheets-Sheet 3
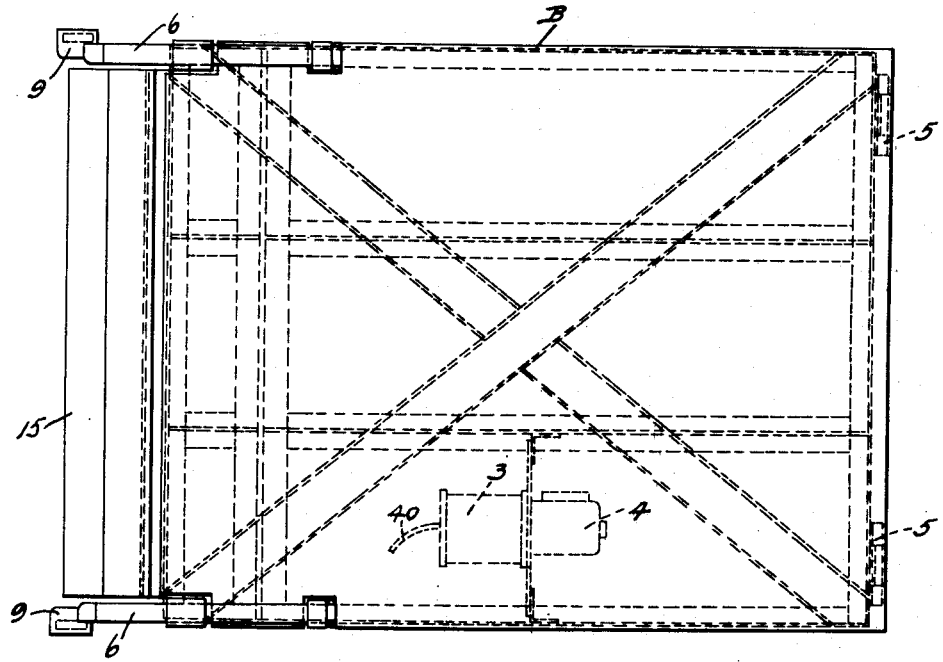
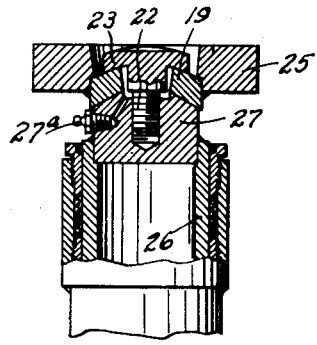
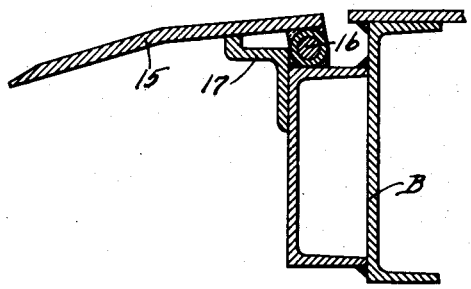
Fig. 7
Fig. 8
Fig. 9
INVENTOR.
Arthur E. Rowe
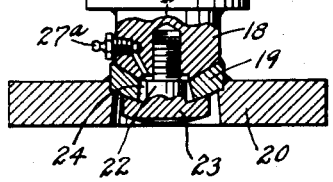

Patented July 14, 1953

2,644,971

UNITED STATES PATENT OFFICE 2,644,971

LOADING DOCK CONSTRUCTION

Arthur E. Rowe, Cleveland, Ohio

Application November 18, 1949, Serial No. 128,040

6 Claims. (Cl. 14—71)

This invention pertains to the art of loading docks of the general type now built and used in conjunction with warehouses, or the like, for facilitating the loading and unloading of automotive trucks or trailers backed up to the dock and adapted to receive and discharge freight either by manual loading and unloading operation, or by the use of lift trucks adapted to carry the freight from the dock into the vehicle truck or truck body and remove same therefrom.

My invention involves certain improvements in the construction of loading docks employing in conjunction therewith one or more loading platforms or decks hinged to the main dock substantially at the level of the floor thereof, but adapted to be raised and lowered for inclining the free end of the deck or platform to adjust the latter to a point of discharge or of loading, which is substantially on a level with the load bearing bed or floor of the truck or other vehicle backed up to the dock. These improvements pertain to the type of constructions of movable platforms or deck units that are set forth in my previous application for patent, filed November 5, 1948, Serial Number 58,490.

In the type of above construction to which my invention relates, the movable dock section, deck, or platform, designed for the purposes above stated, is adapted to be elevated and lowered by means of the provision of an hydraulic unit mounted upon the dock approach floor or pavement on which the trucks or vehicles move in backing them into the dock to bring the bed or floor sections of the trucks or vehicles approximately to the level of the main floor of the dock for easy transfer of the load of freight to and from the vehicle, relatively to said main floor of the dock. One of the main features of improvement of my present invention is the employment of safety provisions for enabling the movable deck or platform of the main dock to float upwardly and downwardly at its free end and while such end is supported upon the vehicle floor or bed, so that the height of the said free end of the deck or platform may adjust itself properly to the height of the vehicle floor incident to varying adjustments of the height of the latter as loads are removed therefrom or emplaced thereon. The safety provisions referred to are included in the operating controls for the actuation of the hydraulic lift unit utilized for the lifting and lowering of the movable deck or platform referred to. The automatic provisions just referred to comprise certain controlling parts which are carried by arms on the hinged deck or platform, which arms are adapted to rest upon the bed of the truck or vehicle in the loading operation, the control means being such that so long as the deck and the bed of the vehicle are interengaged, the said deck or platform will float up and down to accord with variations in the height of the bed of the truck from the floor or pavement on which the wheels thereof are supported. The said provision, however, will act automatically, immediately upon disengagement of the supporting arms on the deck or platform, from the truck bed, to restore the operation of the hydraulic lift unit for holding the deck or platform against dropping, a safety action which is obviously highly desirable in constructions such as that above outlined.

Still another feature of my invention lies in the provision on the free outer end of the movable deck section or platform of the dock of a bridge plate adapted to overlie the bed or floor of the truck to enable freight to be moved from the main dock and its movable platform to and from the truck bed or floor. My invention involves a novel mounting of such bridge plate together with the interaction of the same with the movable platform during the use of the platform in direct cooperation with the truck or vehicle to or from which the freight is being loaded and unloaded respectively.

Another feature of my invention resides in a novel type of hydraulic lift unit mounting means, for supporting the hydraulic unit of the movable platform of my invention, upon its foundation, and for connecting the said unit with the platform itself.

The lay-over arms carried by the free moving end of the deck or platform as employed in this invention are unique in that they are retractably mounted on the platform to insure proper engagement with the vehicle bed or floor by means of wide radial pressure shoes, one carried by each arm. The lay-over arms are advantageously utilized to carry at the shoes thereof certain automatic control means, previously referred to, by which the safety floating action of the platform is initiated when the lay-over arms engage the truck bed or floor during varying vertical movement of the latter.

For a full understanding of my invention and the merits thereof in respect to the construction and operation of the same, reference may be had to the following detailed description, and to the annexed drawings, and in the latter:

Figure 1 is a view, generally in side elevation, showing the loading dock movable platform or deck, the dock proper being shown in section, and also showing a vehicle backed up to the dock at the free end of the platform, an ordinary lifting truck being illustrated as in the process of loading freight onto the bed or floor of the vehicle.

Figure 2 is a view illustrating diagrammatically the oil reservoir and motor carried on the movable platform together with the largely electrically controlled valves and pumps, some in the reservoir and one external thereto, by which the flow of pressurizing fluid to the hydraulic lift unit beneath the movable platform is controlled, along with a diagrammatic showing of the electrical circuit means and switches for the operation of said valves.

Figure 3 is a view showing in a fragmentary manner the outer or free end of the loading platform hinged or pivoted to the main section of the loading dock, the view illustrating particularly the mounting of the bridge plate carried by said platform and the retractable lay-over arms at opposite sides of the free end of the platform, the latter having supporting heads which carry the pressure shoes adapted to engage the floor or bed of the truck or other vehicle.

Figure 4 is a fragmentary view showing more clearly the construction which is shown in Figure 3, in top plan view.

Figure 5 is a sectional view taken about on the line 5—5 of Figure 3, bringing out the mode of mounting the lay-over arms on the movable platform.

Figure 6 is a vertical sectional view taken about on the line 6—6 of Figure 3 bringing out more clearly the manner in which the truck bed engaging shoes are mounted in the head of an associated lay-over arm and are movable so as to actuate the automatic controlling switches, one of which is illustrated in conjunction with said pressure shoe.

Figure 7 is a top plan view of the movable deck or platform, bringing out more clearly the location of the motor and pump means thereon, shown in dotted lines, and also the mounting of the lay-over arms as well as the rigid bracing structure of said platform.

Figure 8 is a detailed view, certain parts broken away, and showing the construction of the hydraulic lift unit or ram, the peculiar bearing connections between the lower end of said unit and a supporting foundation plate and the upper end of said unit and the platform, permitting slight relative movement between the unit and the parts with which it is connected, being clearly shown.

Figure 9 is a detailed sectional view showing primarily the manner of mounting the bridge plate in a floating manner on the outer free end of the movable deck or platform.

Figure 1:
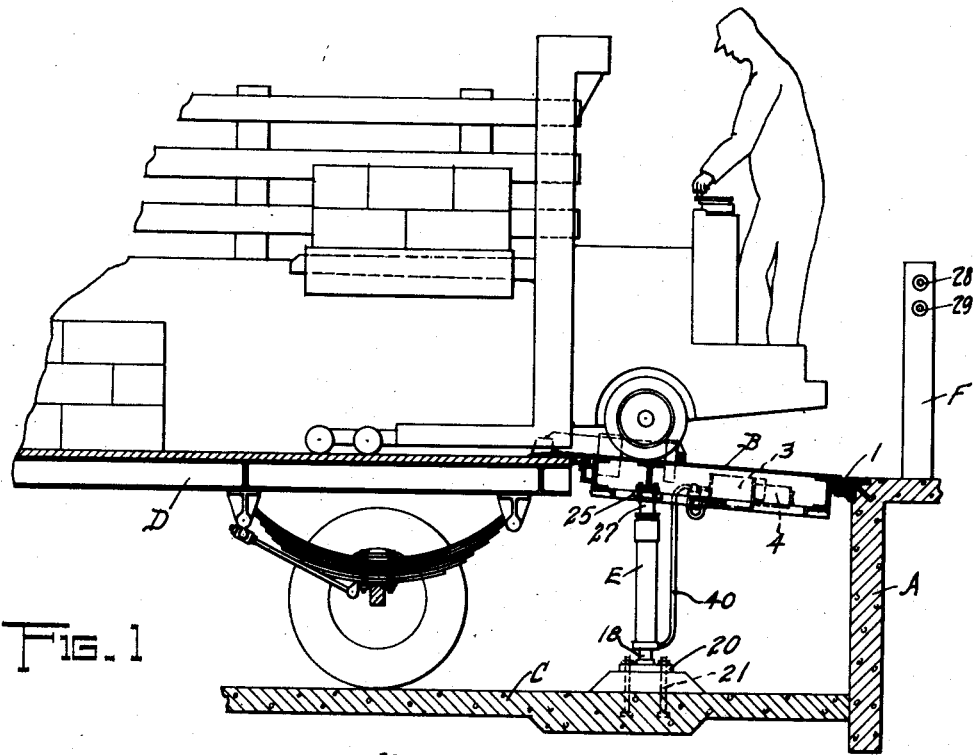

Now, describing the details of this invention more fully, a reference is first made to Figure 1 of the drawings wherein there is depicted the main loading dock designated A, the movable deck or platform B, hinged or pivoted to the dock A at a point substantially on a level with the floor or surface of the dock A, the approach floor or pavement C located outwardly of the dock for travel thereon of the vehicle or truck D which is to be loaded or unloaded in the use of the invention, and the hydraulic lift unit or ram E which is located beneath the movable platform B and connected at its lower end to the foundation or floor C, and at its upper end to the outer portion of the movable platform or deck B. This view also shows the pipe or conduit 40 which leads from the oil reservoir 3 on the platform B downwardly to the lower end of the lift unit E, and the motor 4 adjacent to the reservoir 3 for operating a pump located in the reservoir to pressurize the unit E, when required, for the elevation or raising of the platform B, the latter features to be more fully described later herein.

Referring to Figure 7, the movable platform or deck B is of generally rectangular form, is rigidly braced in all directions for carrying heavy loads and is provided with the hinge members 5 at its inner end providing the pivotal connection at 1, previously mentioned. The general location of the oil reservoir 3 and the motor 4 may be seen by the dotted line showing of these features in Figure 7 and the pressurizing conduit or line is also similarly shown by dotted lines designated at 40.

On the outer or free end of the platform B, at the opposite sides thereof, are supported the lay-over arms 6 which are held in place on the platform B by welded fabricated loop members or guides 7. The lay-over arms 6 are adapted to slide horizontally on the platform B as each arm is supported by two of the members 7, and the extent of projection of the outer ends of the arms 6 from the free moving end of the platform B is limited by means of employing a stop lug 8 carried by the inner end of each arm and capable of engagement with the innermost one of the loops 7 cooperating with the arm.

At the outer end of each arm 6 is provided a head 9 of somewhat hollow formation, as seen in Figure 6 more clearly and also in Figure 3, and on this head 9 is mounted a truck or vehicle floor engaging and load receiving shoe 10, supported by a plunger-like mounting member 11, provided at its upper end with a head 12, located in the hollow portion of the head 9, the shoe 10 being so disposed as to operate with a certain limited vertical movement when the shoe is loaded incident to the engagement thereof with said vehicle floor or bed. The head portion 12 of each of the members 11 is disposed in a position such that upon upward movement of the shoe 10 it will engage with the button or actuating member 13 of an electric switch 14 for a purpose to be later referred to and described.

Carried by the outer end of the platform B also, see Figures 3, 7 and 9, is a bridge plate 15 comprising outwardly downwardly inclined, and inwardly downwardly inclined integral portions, this plate being pivotally attached at 16 to the platform B, and being limited in its downward movement by means of a stop bracket 17 on the platform B. The bridge plate 15 is capable of a considerable amount of upward movement so that when it rides on the bed or floor of a truck it may occupy a position inclining downwardly toward the deck B, and its limited downward movement to the position in which it is shown in Figure 3 discloses also that it may incline downwardly or upwardly to the point of engagement with the bed or floor of the truck. These opposite inclinations of the bridge plate 15 are desirable and necessary, having in view that the truck bed may be lower than the level of the outer end of the deck or platform B or higher, when the platform is supported in cooperation with the truck bed, and having in mind also that relative movement of the bed and the platform B vertically takes place incident to movement of the bed upwardly and downwardly by yielding and expansion of the springs of the vehicle as the truck or vehicle is loaded or unloaded respectively, in the transfer of freight from the platform B to the vehicle D, and vice versa.

The construction of the lift unit E will next be described. This unit is clearly shown in Figure 8 of the drawings, respecting the details thereof. The unit E includes a lower cylinder having a projection 18 extending downwardly from the bottom end thereof and having a convex bearing portion at its lower extremity. Said convex bearing portion operates in contact with a concave bearing plate 19, welded or otherwise rigidly attached to a foundation plate 20, the latter being bolted as shown at 21 in Figure 1 to the subfloor or approach pavement C of the loading dock. For connecting the lower end of the member 18 of the cylinder E for rocking bearing movement on the bearing plate 19, and to prevent displacement of unit E from the foundation plate 20, I employ a screw fastening member 22, the shank of which is adapted to screw into the projection 18 from the lower end of the latter, and the head 23 of which is concaved on its upper side for engaging the under convex surface of the plate 19. The body of the fastening member 22 passes through an enlarged opening 24 in the plate 19, an opening of a diameter greater than the diameter of the body of the fastening member 22 so as to afford a rocking movable mounting in a self-evident manner, for the unit E, at its lower end.

The upper end of the unit E is mounted in connection with the platform B by means of a platform or deck anchoring plate 25 functioning in a manner similar to the plate 20 previously described, the piston 26 of the cylinder E having a central projection 27 similar to the projection 18, and the connection between the parts 27 and 25 comprising elements 19, 22, and 23, similar to the correspondingly numbered elements at the lower end of cylinder E. Suitable grease fittings 27a are carried by the members 18 and 27 to facilitate the supplying of a lubricant under pressure to passages leading from the fitting passage to the working space between the parts 22 and 19, and the bearing portions between the parts 18 and 19 and the parts 27 and 19, as seen best in Figure 8 previously referred to.

As seen in Figure 1 of the drawings, there may be located on the main dock A, or in any convenient place juxtaposed to the dock A and platform B, an operator station F comprising a suitable panel having a manual switch 28 operable to control upward movement of the platform B and a second similar switch 29 for controlling downward movement of said platform.

Figure 2:
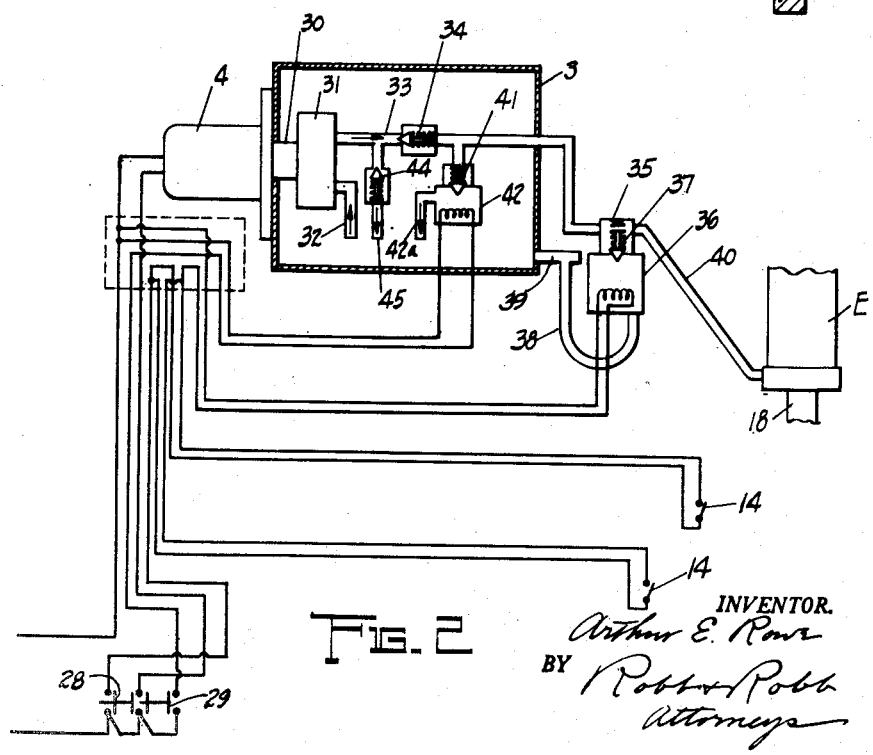

The control means for the operation of the platform B, according to this invention, is largely electrical, and since the electrical features, as to detail parts, are generally conventional, as well as the types of valves employed, such parts are illustrated diagrammatically in Figure 2 of the drawings, in association with the pressure oil reservoir 3 and the motor 4.

Referring particularly to Figure 2 of the drawings, it will be noted that the motor 4 is drivingly connected by its shaft 30 to a suitable pump 31 within the reservoir 3. An inlet pipe 32, open to the flow of the pressure oil in the reservoir 3, provides the pump with its oil intake. Leading from the pump 31 is an outlet conduit or pipe 33 having a valve chamber containing a check valve 34 adapted to close to hold the pressure in the outlet pipe at the right of the valve chamber, as seen in Figure 2. The outlet pipe 33 leads through the right end wall of the reservoir 3 and extends downwardly to the inlet chamber 35 of a by-pass valve casing comprising the by-pass chamber 36, the inlet chamber 35 containing the solenoid operated valve 37. From the by-pass chamber 36 a by-pass pipe or conduit 38 leads back to the oil reservoir 3 at the nipple coupling 39. From the inlet chamber 35, with which the out-flow pipe 33 is connected, there leads downwardly the pressure supply conduit 40 which is connected with the lower end of the cylinder E of the hydraulic lift unit and when the lift unit is pressurized by a supply of pressure fluid through the conduit 40, the piston of the unit E will rise in the cylinder thereof and move the platform B upwardly.

Within the reservoir 3 there is provided a solenoid operated release valve 41 supported in a valve chamber, the upper end of which is connected with the outlet pipe 33 of the pump at a point between the check valve 34 and the by-pass valve casing into which said pipe 33 leads or is connected, the casing 42 has an out-flow pipe 42a leading into the reservoir 3. Also in the reservoir 3 is an overload relief valve 44, the valve casing of which is connected at its upper end to the pipe 33 at a point between the pump 31 and the check valve 34, and the casing of which valve 44 is provided with an out-flow pipe 45 leading into the reservoir 3.

In the diagrammatic illustration of Figure 2 there are shown the two semi-automatically operating switches 14 which are carried in the heads 9 on the lay-over arms 6 of the platform B. In this figure there will also be seen the manual switch 28 for controlling the upward movement of the platform B, and the corresponding switch 29 for controlling the downward movement of said platform. Also in this view are illustrated various conductors which lead from the various switches to the parts which they control, including the conductors which lead from the switches 28 and 29 to the motor 4. The electrical conductors may be of any conventional kind and connected up with the parts controlled thereby after customary electrical technique, within the purview of the invention.

Having described the various controlling switches and valve, and passages for the movement of the pressurizing fluid in the controlling system, the operation of the control mechanism may now be set forth.

*Operation of raising platform.*—For controlling the upward movement of the platform B to raise the free end of the platform sufficiently to bring the lay-over arms 6 to an elevation well above the elevation of a truck bed, as the truck is backed into the dock A, and preliminary to later lowering platform B to cause the arms 6 to rest upon the floor or bed of the truck D, the operator will close the switch 28 at the operator station F. This starts the motor 4 and the operation of the pump 31 in the reservoir 3 to thereby force the high pressure oil past the relief valve 44, normally remaining closed, past the check valve 34 as it goes through the outlet pipe 33 of the pump, and then through the intake chamber 35 of the by-pass valve casing 36 and through the conduit 40 to the lower end of the cylinder of the hydraulic unit E. As long as the switch 28 is kept closed under the foregoing conditions, the piston in the hydraulic cylinder of the unit E will be pressurized and the platform B will continue to move upwardly. The overload relief valve 45 remains closed under all normal conditions of use of the platform B except when the latter is overloaded beyond a predetermined maximum which may be 20,000 pounds or some other amount fixed at the time of the building of the apparatus. When the switch 28 is released, the operation of the motor 4 and the pump 31 ceases and thereupon the check valve 34 closes, thus trapping the pressure oil between check valve and the piston in the cylinder of the unit E, for holding the platform B in the predetermined or reached elevated position. The platform or deck B will now support any load up to the maximum capacity previously referred to.

*Operation of lowering platform.*—For the lowering of the platform B the switch 29 is operated by pressure thereon, said switch being of the self-releasing button type, like the switch 28. The operation of the switch 29 causes actuation of the solenoid for the release valve 41 and opens the said valve allowing the oil in the conduit 40 and the portion of the outflow pipe 33 leading back to the casing 42, to flow back through the outflow pipe 42a of the casing 42, into the reservoir 3. The opening controlled by the valve 41 is restricted in size so that the back flow of the oil incident to opening of the release valve 41 will be restricted and insure that a constant slow speed of descent of the platform B is obtained whether said platform is loaded or empty. Release of the switch or switch button 29 will de-energize the solenoid of the valve 41 so the latter will close and stop the downward movement of the platform B.

*Safety floating operation of the platform.*—It has been mentioned herein before that the platform B in loading and unloading operations of the truck or vehicle D, is engaged with the floor or bed of the vehicle by means of the lay-over arms 6, the shoes 10 of which rest on the vehicle floor, and by reason of their convex floor contacting lower surfaces, accommodate the arms to maintenance of proper resting engagement with the vehicle bed notwithstanding that the arms 6 and the deck or platform B may assume various angles within a predetermined limit up and down, from the horizontal. The safety feature involved in this construction lies in enabling the deck or platform B to float up and down while maintained in engagement with the vehicle floor so that at no time can the platform remain elevated above the vehicle floor as the freight is trucked or carried by lift trucks across the bridge plate 15 from the platform B to the vehicle. The so called floating feature above described, respecting the platform B, is controlled by the automatic action of the switches 14 operated through the pressure members 13 actuated from the shoes 10 on the heads 9 of the lay-over arms 6. Thus, assuming that the platform B has been elevated high enough to provide full clearance for its outer ends and the bridge plates 15, as the truck D is backed into the dock 1 at the platform B, the lay-over arms 6 will overhang the vehicle bed. Then the operator will lower the platform B until the arms 6 come to rest, by means of their shoes 10, upon the bed of the vehicle. Immediately that this condition is obtained, one or both of the switches 14 will go into action to energize the solenoid of the solenoid operated by-pass valve 37, thereby opening the by-pass 38 from the chamber 36 back to the reservoir 3. The valve 37 being open, it is obvious that upon downward movement of the platform B the pressure fluid in the conduit 40 will be by-passed back into the reservoir 3 through the pipe 38 and the oil trapped in the pressure line will not provide any resistance to free upward or downward movement of the platform B. In this manner the platform B is susceptible of free floating upwardly and downwardly while its free outer end is supported or carried upon the bed of the vehicle which, of course, moves upwardly and downwardly upon changing of the loading of the vehicle either in emptying it of freight or in loading it with freight.

It is notable that when the platform is preliminarily elevated prior to the backing of the vehicle to the same for loading or unloading at the dock 1, the bridge plate 15 will by gravity incline downwardly until it is resting upon the supporting stop 17. Thereafter, when the platform B is lowered to engage the lay-over arms 16 with the bed of the vehicle D, the free edge portion of the bridge plate 15 will strike the floor or bed of the vehicle and when the platform is stopped in its downward movement the bridge plate will be automatically positioned properly to span the space between the outer end of the platform B and the said vehicle bed. This is true whether the vehicle bed is slightly higher than the platform B or whether it is slightly lower. Also, it will be understood that the bridge plate 15 automatically adjusts itself always by up and down pivotal movement at its outer end, upon its pivotal axis 16, incident to any variation in the relative height of the vehicle bed and the platform B as the latter floats in supported relation by the bed of said vehicle. As the vehicle D, or a similar vehicle, is backed into proper loading or unloading relation to the platform B the lay-over arms 6 are preferably positioned in their extended positions, as illustrated in Figure 3, but said arms are adapted to be retracted by impingement with the bed of the vehicle or should said bed move slightly away from the platform B, these arms will be movable in the direction outward of the movement of the said vehicle bed.

It is contemplated that various types of valve means may be employed for the purposes of the valve units in the system of the control mechanism above described, and likewise, different types of electric switches may be utilized so long as they will enable the performance of the operations set forth.

Should the vehicle D pull away from the platform B prior to authorized elevation or lifting of the arms 6 off of the bed of the vehicle, the switches 14 will be opened by reason of removal of the pressure against the shoes 10, and consequently, the solenoid previously maintaining the by-pass valve 37 open, will be de-energized, thereby closing the valve 37 and again trapping the pressure fluid in the pipes or conduits 40 and 33 back to the check valve 34 and locking or holding the platform in a fixed position against lowering or dropping, with resultant possible damage.

The valves 34 and 44 are preferably spring loaded valves.

Having thus described my invention, what I claim as new and desire to secure by Letters Patent of the United States is:

1. In a loading dock construction, in combination, a main elevated dock, a loading and unloading platform, to which a vehicle may be backed, said platform being connected at its inner end to the dock and movable upwardly and downwardly at its outer end, a lift unit coacting with the platform to elevate and lower the same, control mechanism for said lift unit including means for effecting raising and lowering of the platform, lay-over arms on said outer end of the platform disposed to engage the floor of a vehicle backed up to the platform for supporting the platform, instrumentalities carried by the lay-over arms operable by the floor of a vehicle when the arms engage said floor, and means operable by said instrumentalities to deactivate the lift unit for transferring the weight of the platform at its outer end to the vehicle on engagement of the lay-over arms therewith.

2. In a loading dock construction, in combination, a main elevated dock, a loading and unloading platform, to which a vehicle may be backed, said platform being connected at its inner end to the dock and movable upwardly and downwardly at its outer end, a lift unit coacting with the platform to elevate and lower the same, control mechanism for said lift unit for effecting raising and lowering of the platform, lay-over arms on said outer end of the platform disposed to engage the floor of a vehicle backed up to the platform for supporting the platform, and members on said arms adapted to impinge the floor of a vehicle engaged by said arms and coacting with the control mechanism of the platform to automatically deactivate the lift unit to allow free floating movement up and down of the platform with corresponding movement of the vehicle floor.

3. In a loading dock construction, in combination, a main elevated dock, a loading and unloading platform, to which a vehicle may be backed, said platform being connected at its inner end to the dock and movable upwardly and downwardly at its outer end, a lift unit coacting with the platform to elevate and lower the same, control mechanism for said lift unit for effecting raising and lowering of the platform, devices supported by the platform engageable with a vehicle, and means operable by the said devices connected to actuate the control mechanism to deactivate the lift unit to condition the platform for free floating up and down movement at its outer end.

4. In a loading dock construction, in combination, a main elevated dock, a loading and unloading platform, to which a vehicle may be backed, said platform being connected at its inner end to the dock and movable upwardly and downwardly at its outer end, a lift unit coacting with the platform to elevate and lower the same, control mechanism for said lift unit including fluid pressure supply means for the lift unit, valve means operable to control the action of the pressure fluid on the lift unit to raise and lower the outer end of the platform, to cause free floating of the platform and hold the platform in a predetermined position, and instrumentalities on the platform cooperable with a vehicle backed to the same, to condition certain of the valve means to direct the pressure fluid in a manner to deactivate the valve control means for the pressure fluid supplied to the lift unit to effect free floating up and down of the platform with up and down movement of the vehicle bed.

5. A dock construction as claimed in claim 4, in which the last instrumentalities include an electric circuit comprising switch means directly operable by a vehicle, and electro-mechanical devices actuated by the switch means for adjusting certain of the valve means.

6. In a loading dock construction, in combination, a main elevated dock, a loading and unloading platform, to which a vehicle may be backed, pivoted at its inner end to the dock and movable upwardly and downwardly at its outer end, a lift unit coacting with the platform to elevate and lower the same, control mechanism for said lift unit coacting with said unit for effecting raising and lowering of the platform, said lift unit comprising a cylinder and piston, a projection on the piston for connection to the platform, a projection on the cylinder for foundation connection, a plate attached to the platform having a concave under side bearing portion engaging said projection of the piston and having a center opening, a plate attachable to a foundation having a concave upper side bearing portion engaging the cylinder projection and having a center opening, a fastening member of a diameter smaller than each of said openings passing therethrough and detachably connected to the projection adjacent thereto, and a head on each fastening member larger than the opening of the adjacent plate and engaging the plate at a side opposite the engagement of the associate projection, whereby a rocker bearing is obtained for each said cylinder and piston elements.

ARTHUR E. ROWE.

References Cited in the file of this patent

UNITED STATES PATENTS

| Number | Name | Date |
|---|---|---|
| 1,144,836 | Green | June 29, 1915 |
| 1,905,947 | Morgan | Apr. 25, 1933 |
| 2,329,855 | Rydner | Sept. 21, 1943 |
| 2,337,138 | Van Berg | Dec. 21, 1943 |
| 2,424,876 | Butler | July 29, 1947 |
| 2,449,829 | Agren | Sept. 21, 1948 |
| 2,452,289 | Bryson | Oct. 26, 1948 |
| 2,461,678 | Christensen | Feb. 15, 1949 |
| 2,527,653 | Pierce | Oct. 31, 1950 |
| 2,560,064 | Astry | July 10, 1951 |
| 2,626,411 | Palmer | Jan. 27, 1953 |

OTHER REFERENCES

Architectural Record, October 1948, page 179.